United States Patent
Wang et al.

(10) Patent No.: US 10,699,692 B2
(45) Date of Patent: Jun. 30, 2020

(54) ACTIVE SOUND EFFECT GENERATING DEVICE

(71) Applicant: HONDA MOTOR CO., LTD., Minato-Ku, Tokyo (JP)

(72) Inventors: Xun Wang, Wako (JP); Toshio Inoue, Wako (JP); Takuma Maesaka, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 16/252,964

(22) Filed: Jan. 21, 2019

(65) Prior Publication Data
US 2019/0228759 A1 Jul. 25, 2019

(30) Foreign Application Priority Data
Jan. 22, 2018 (JP) .................... 2018-008102

(51) Int. Cl.
| | |
|---|---|
| *G10K 15/02* | (2006.01) |
| *B60Q 5/00* | (2006.01) |
| *H04R 29/00* | (2006.01) |
| *G10K 15/04* | (2006.01) |
| *B60Q 9/00* | (2006.01) |
| *B60R 11/02* | (2006.01) |

(52) U.S. Cl.
CPC ............... *G10K 15/02* (2013.01); *B60Q 5/00* (2013.01); *H04R 29/001* (2013.01); *B60Q 5/008* (2013.01); *B60Q 9/00* (2013.01); *B60R 11/02* (2013.01); *G10K 15/04* (2013.01); *H04R 2499/13* (2013.01)

(58) Field of Classification Search
CPC .......... G10K 15/02; B60Q 5/00; B60Q 5/008; H04R 29/001; H04R 2499/13; B30W 50/14
See application file for complete search history.

(56) References Cited

U.S. PATENT DOCUMENTS

| | | | | |
|---|---|---|---|---|
| 2011/0010269 A1* | 1/2011 | Ballard | ................. | B60Q 5/008 705/26.41 |
| 2012/0130580 A1* | 5/2012 | Omote | ................. | B60Q 5/008 701/22 |

(Continued)

FOREIGN PATENT DOCUMENTS

| | | | | |
|---|---|---|---|---|
| DE | 10 2011 112 181 A1 | | 4/2012 | |
| DE | 102011112181 A1 * | | 4/2012 | ............. G10K 15/02 |

(Continued)

OTHER PUBLICATIONS

Mursic et al, The Shepard risset glissando music that moves you (Year: 2017).*

(Continued)

*Primary Examiner* — Davetta W Goins
*Assistant Examiner* — Kuassi A Ganmavo
(74) *Attorney, Agent, or Firm* — Carrier Blackman & Associates, P.C.; Joseph P. Carrier; Jeffrey T. Gedeon

(57) ABSTRACT

Sound effects are generated from a speaker inside a vehicle compartment repeatedly between a lower limit frequency and an upper limit frequency in accordance with an increase in the vehicle velocity. Consequently, the frequency is increased with respect to an increase in the vehicle velocity, in a manner so that audible sound effects, that is, sound effects at a so-called infinite scale, are generated.

7 Claims, 12 Drawing Sheets

(56) References Cited

U.S. PATENT DOCUMENTS

| | | | | |
|---|---|---|---|---|
| 2012/0148066 | A1* | 6/2012 | Honji | G10K 15/04 381/86 |
| 2012/0299717 | A1* | 11/2012 | Yoshino | B60Q 9/00 340/466 |
| 2013/0021492 | A1* | 1/2013 | Tatsuzawa | H04N 5/2252 348/222.1 |
| 2013/0214921 | A1* | 8/2013 | Meschke | B60Q 5/008 340/467 |
| 2015/0197195 | A1* | 7/2015 | Hera | G10K 15/02 381/86 |
| 2015/0264500 | A1* | 9/2015 | Aoyagi | G10K 15/00 381/56 |
| 2015/0353007 | A1* | 12/2015 | Inoue | B60Q 5/00 381/61 |
| 2016/0118037 | A1* | 4/2016 | Yun | G10K 11/178 381/71.4 |
| 2016/0214532 | A1* | 7/2016 | Hera | B60Q 9/00 |
| 2017/0327004 | A1* | 11/2017 | Mochizuki | B60L 15/20 |
| 2018/0043826 | A1* | 2/2018 | Every | B60C 9/00 |

FOREIGN PATENT DOCUMENTS

| | | |
|---|---|---|
| JP | 2015-229403 A | 12/2015 |
| JP | 2017-509522 A | 4/2017 |
| WO | 2015/105978 A1 | 7/2015 |

OTHER PUBLICATIONS

Search Report dated Sep. 16, 2019 issued over the corresponding German Patent Application No. 10 2019 200 679.5 with the English translation thereof.

Office Action dated Sep. 3, 2019 issued over the corresponding Japanese Patent Application No. 2018-008102 with the English translation thereof.

* cited by examiner

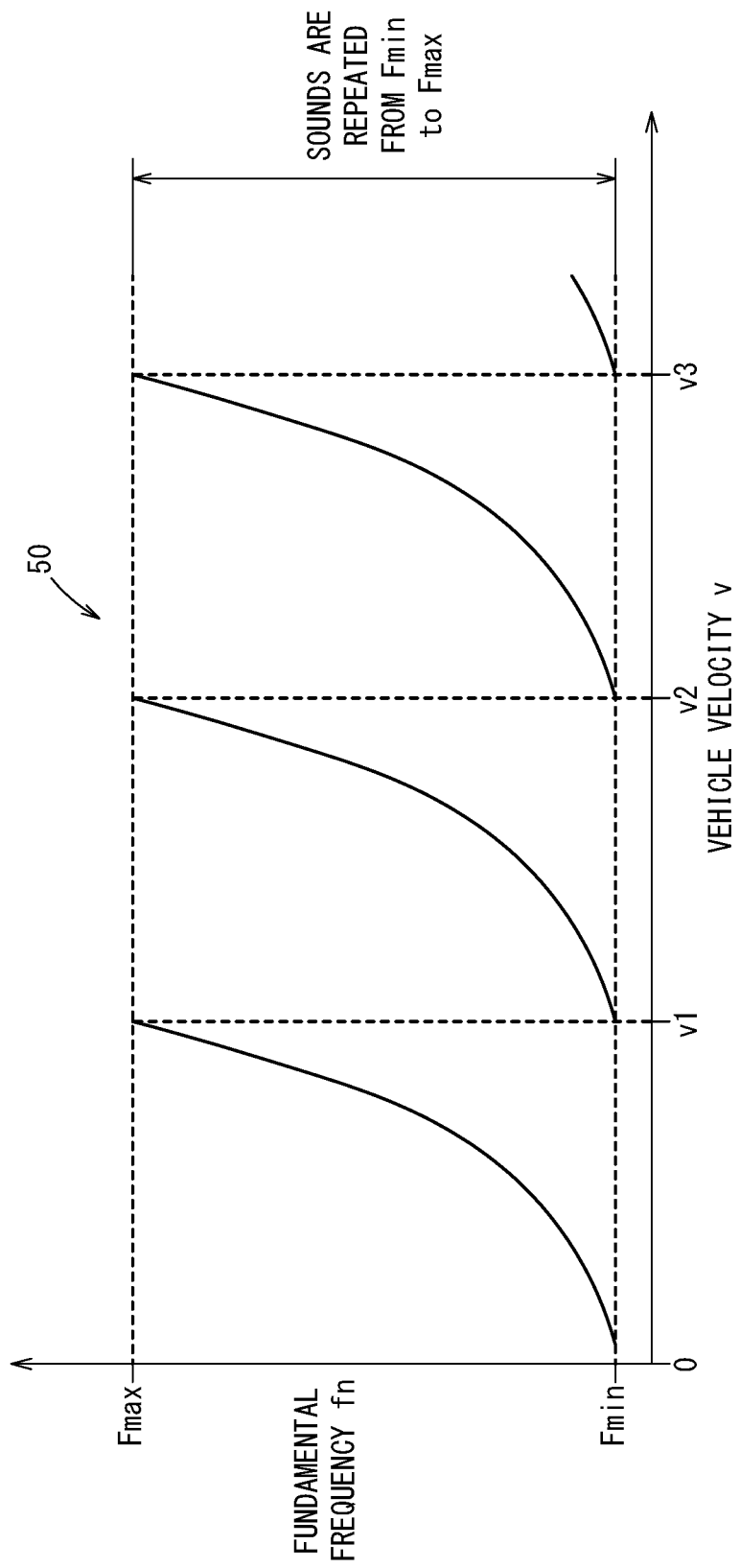

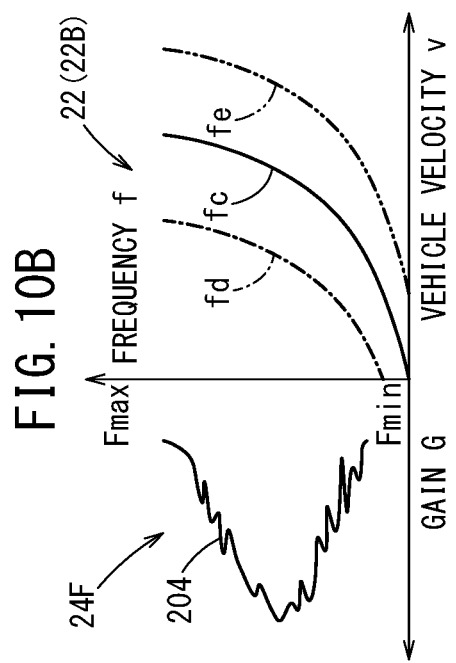
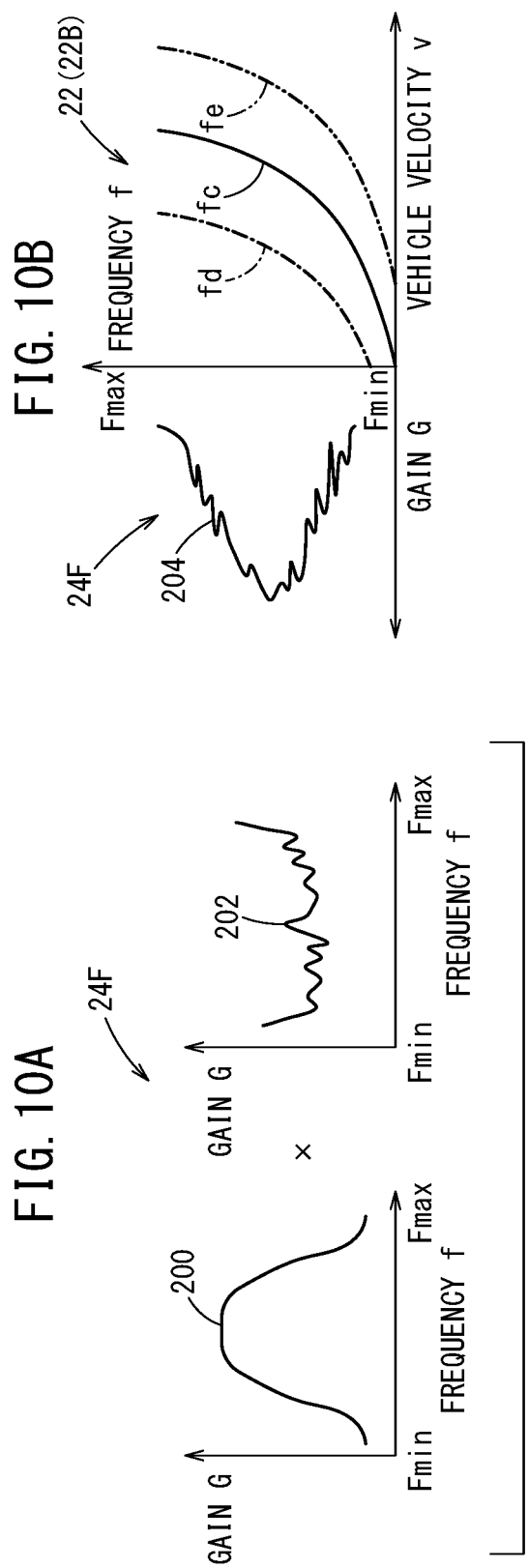

ACTIVE SOUND EFFECT GENERATING DEVICE

CROSS-REFERENCE TO RELATED APPLICATION

This application is based upon and claims the benefit of priority from Japanese Patent Application No. 2018-008102 filed on Jan. 22, 2018, the contents of which are incorporated herein by reference.

BACKGROUND OF THE INVENTION

Field of the Invention

The present invention relates to an active sound effect generating device configured to generate sound effects inside a vehicle compartment in accordance with the vehicle velocity from a speaker in the interior of the vehicle, and in particular, relates to an active sound effect generating device which is installed in a vehicle equipped with an electric motor as a drive source for the vehicle.

Description of the Related Art

For example, as disclosed in Japanese Laid-Open Patent Publication No. 2015-229403 (hereinafter referred to as JPA2015-229403), in a vehicle equipped with an electric motor as a drive source and in which an active sound effect generating device is installed, settings are made in a manner so that acoustic signals, which are a mixture of a virtual frequency corresponding to the engine rotational speed that increases in accordance with an increase in the vehicle velocity and a harmonic frequency of the virtual frequency, are supplied to a speaker (see paragraphs [0037] [0038], [0043] and FIGS. 1 and 2 of JPA2015-229403).

Furthermore, an amplitude of the acoustic signals is set so as to increase as the degree of opening of the accelerator pedal and the virtual frequency increase, and the sound effects, which are generated inside the vehicle compartment, are controlled so as to become larger by the speaker in the interior of the vehicle (see paragraphs [0053], [0054] and FIG. 2 of JPA2015-229403).

SUMMARY OF THE INVENTION

In the conventional active sound effect generating device described above, since the sound effects inside the vehicle compartment are controlled so as to increase in accordance with an increase in the degree of opening of the accelerator pedal and the virtual frequency, it is possible for a vehicle occupant such as the driver or the like to hear the sound effects corresponding to operations of the accelerator pedal by the driver and fluctuations in the vehicle velocity accompanying such operations, and a sense of comfort during driving operations can be obtained. In this manner, the conventional active sound effect generating device has high merchantability.

Incidentally, with such a conventional active sound effect generating device, as the vehicle increases in velocity, within the sound effects, which are generated on the basis of a frequency corresponding to the vehicle velocity, high frequency components the directivity of which is narrow (high) become dominant in comparison with low frequency components having wide directivity. As a result, it is easy for the vehicle occupant such as the driver or the like to notice that the sound effects are being reproduced by the speaker.

However, in high velocity regions, if the vehicle occupant such as the driver or the like notices that the sound effects, which are generated in accordance with an increase in the vehicle velocity, are being reproduced from the speaker, the realism of the sound effects as automotive running sounds is impaired, and a sense of incompatibility is imparted to the vehicle occupant such as the driver or the like. As a result, in high velocity regions, there is a concern that the merchantability of the active sound effect generating device may be deteriorated.

The present invention has been devised taking into consideration the aforementioned problems, and has the object of providing an active sound effect generating device which exhibits a high sense of realism as automotive running sounds, even if the sound effects therefrom, which are generated in accordance with an increase in the vehicle velocity, occur within a high velocity region.

An active sound effect generating device according to the present invention is installed in a vehicle equipped with an electric motor as a drive source for the vehicle, and comprises a vehicle velocity detecting device configured to detect a vehicle velocity, and a vehicle velocity corresponding frequency setting unit configured to set a vehicle velocity corresponding frequency of a sound effect made up from frequencies having a plurality of ordered components so as to be generated from a speaker in accordance with a detected vehicle velocity, wherein the vehicle velocity corresponding frequency setting unit is configured to set the vehicle velocity corresponding frequency between a lower limit frequency and an upper limit frequency, and exponentially increase the frequencies having the plurality of ordered components in accordance with an increase in the vehicle velocity, respectively, from the lower limit frequency to the upper limit frequency, together with setting a frequency ratio of the plurality of ordered components so as to have a constant multiple relationship, and performing a control in a manner so that the sound effect is generated repeatedly between the lower limit frequency and the upper limit frequency in accordance with an increase in the vehicle velocity.

According to the present invention, by utilizing the concept of an infinite scale, and repeatedly generating sound effects in which the frequency ratio of the plurality of frequencies of the respective ordered components always becomes constant between the lower limit frequency and the upper limit frequency, even if only sounds in a comparatively low frequency region are used, it is possible to generate acceleration sound effects that do not produce a feeling of discomfort in accordance with the vehicle velocity and the vehicle acceleration.

As a result, it is possible to maintain a high level of realism (a natural feeling) as automotive running sounds, even if the sound effects, which are generated in accordance with an increase in the vehicle velocity, occur within a high velocity region.

In this case, assuming that:

the constant multiple is indicated by a (a>1);
the vehicle velocity corresponding frequency is indicated by fn, fn×a, fn×a^2, . . . , with the symbol ^ indicating exponentiation;
the lower limit frequency is indicated by Fmin;
the upper limit frequency is indicated by Fmax;
the vehicle velocity is indicated by v;
a frequency rate of change adjustment coefficient is indicated by k; and
the vehicle velocity v when the sound effect has reached the upper limit frequency Fmax is indicated by V;

then the vehicle velocity corresponding frequency fn may be determined by the expression:

$$fn = Fmin \times a\char`\^\{(v-V)/k\},$$

wherein if fn≥Fmax, then V→V+1.

According to this aspect of the present invention, by utilizing the concept of an infinite scale, and repeatedly generating sound effects in which the frequency ratio of the plurality of frequencies of the respective ordered components always becomes the constant multiple a between the lower limit frequency Fmin and the upper limit frequency Fmax, even if only sound effects in a comparatively low frequency region are used, it is possible to generate acceleration sound effects that do not produce a feeling of discomfort in accordance with the vehicle velocity v and the vehicle acceleration.

As a result, it is possible to maintain a high level of realism (a natural feeling) as automotive running sounds, even if the sound effects, which are generated in accordance with an increase in the vehicle velocity v, occur within a high velocity region.

In this case, assuming that:

the constant multiple is indicated by a (a>1);

the vehicle velocity corresponding frequency is indicated by fn, fn×a, fn×a^2, . . . , with the symbol ^ indicating exponentiation;

the lower limit frequency is indicated by Fmin;

the upper limit frequency is indicated by Fmax;

the vehicle velocity is indicated by v;

a frequency rate of change adjustment coefficient is indicated by k;

the vehicle velocity v when the sound effect has reached the upper limit frequency Fmax is indicated by V;

a vehicle velocity increment is indicated by Δv;

a sound effect increment is indicated by Δfn; and a vehicle velocity corresponding frequency, which is lower than the vehicle velocity v by the vehicle velocity increment Δv, is indicated by fn−1;

then the vehicle velocity corresponding frequency fn may be determined by the expression:

$$fn = (fn-1) + \Delta fn$$
$$= (fn-1) + \{(\log a)/k\} \times Fmin \times a\char`\^\{(v-V)/k\} \times \Delta v,$$

wherein if fn≥Fmax, then V→V+1 (0, v1, v2, or v3, . . . ), and fn→4 Fmin.

According to this aspect of the present invention, even if parameters such as the frequency rate of change adjustment coefficient k and the upper limit frequency Fmax are switched depending on the vehicle velocity v, the frequency of the sound effects can be continuously changed in accordance with the increase in the vehicle velocity.

Moreover, the frequency rate of change adjustment coefficient k may be controlled based on the vehicle velocity v.

According to this aspect of the present invention, since the frequency rate of change adjustment coefficient k is controlled on the basis of the vehicle velocity v, it is possible to control (tune) the amount of change in the vehicle velocity corresponding frequency with respect to the change in the vehicle velocity, and to generate sound effects while confirming the sense of realism thereof as automotive running sounds.

In the respective aspects of the present invention described above, there may further be provided a gain device configured to multiply a sound effect signal input to the speaker by a gain multiplier, wherein the gain device is configured to set the gain multiplier in a manner so that the sound effect becomes smaller at a time of switching the vehicle velocity corresponding frequency from the upper limit frequency to the lower limit frequency during an increase in the vehicle velocity.

According to this aspect of the present invention, when the upper limit frequency is switched to the lower limit frequency in accordance with an increase in the vehicle velocity, the sound effects can be switched smoothly, naturally, and without a sense of discomfort.

According to the present invention, by utilizing the concept of an infinite scale, and repeatedly generating sound effects in which the frequency ratio of the plurality of frequencies of the respective ordered components always becomes constant between the lower limit frequency and the upper limit frequency, even if only sound effects in a comparatively low frequency region are used, it is possible to generate acceleration sound effects that do not produce a feeling of discomfort in accordance with the vehicle velocity and the vehicle acceleration.

As a result, it is possible to maintain a high level of realism (a natural feeling) as automotive running sounds, even if the sound effects, which are generated in accordance with an increase in the vehicle velocity, occur within a high velocity region.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 3 is a map showing an example of a fundamental frequency generation table;

FIG. 10A is an explanatory diagram showing an example of creating a frequency gain table according to the fourth embodiment;

FIG. 10B is an explanatory diagram of a frequency gain characteristic table;

DESCRIPTION OF THE PREFERRED EMBODIMENTS

Preferred embodiments of an active sound effect generating device according to the present invention will be presented and described in detail below with reference to the accompanying drawings.

First Embodiment

[Configuration of First Embodiment]

Figure 1:
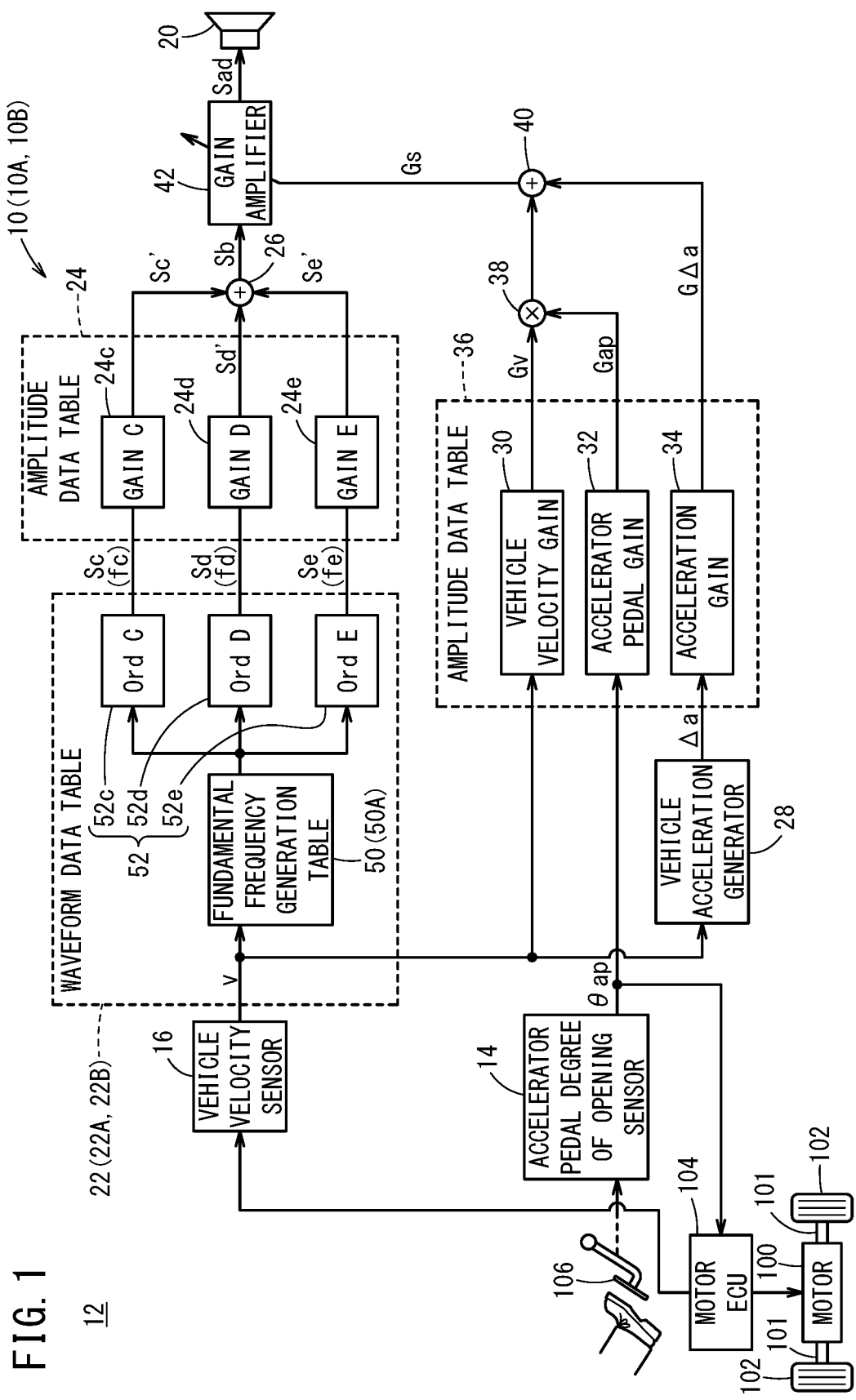
FIG. 1 is a block diagram showing a schematic configuration of a vehicle in which there is installed an active sound effect generating device according to a first embodiment.

FIG. 1 is a block diagram showing a schematic configuration of a vehicle 12 in which there is installed an active sound effect generating device 10 according to the first embodiment.

The vehicle 12 is an electric vehicle including a fuel cell vehicle, a hybrid vehicle, or the like (which may be an automatically driven vehicle in addition to a manually driven vehicle), and is equipped with a motor 100 as a drive source for vehicle wheels (driven wheels) 102. The motor 100 is controlled by a motor ECU (Electronic Control Unit) 104 which is a computer.

An accelerator pedal degree of opening θap is supplied to the motor ECU 104 from an accelerator pedal degree of opening sensor 14 that detects the degree of opening of an accelerator pedal 106.

The motor ECU 104 drives the motor 100 according to the accelerator pedal degree of opening θap, and the driven motor 100 rotates the vehicle wheels 102 via an axle 101. A transmission may be interposed between the motor 100 and the axle 101.

The vehicle velocity v [km/h] is detected by a vehicle velocity sensor 16 on the basis of the rotational speed of the motor 100 or the rotational speed of the axle 101.

The active sound effect generating device 10 is constituted from an acoustic control ECU, generates an acoustic signal Sad in accordance with the vehicle velocity v supplied from the vehicle velocity sensor 16, and the accelerator pedal degree of opening θap supplied from the accelerator pedal degree of opening sensor 14, and supplies the acoustic signal Sad to a speaker 20 via a non-illustrated D/A converter.

The speaker 20 outputs sound effects into the interior of the vehicle compartment corresponding to the acoustic signal Sad generated by the active sound effect generating device 10.

The active sound effect generating device 10 comprises a waveform data table (also referred to as an ordered acoustic signal generator) 22, which generates ordered acoustic signals Sc, Sd, Se having the ordered acoustic frequencies fc, fd, fe on the basis of the vehicle velocity v, an amplitude data table (also referred to as a vehicle velocity gain table for each order) 24 made up from a gain C table 24c, a gain D table 24d, and a gain E table 24e, which adjust (normally, amplify) the amplitudes (gains) of the ordered acoustic signals Sc, Sd, Se, respectively, to thereby generate ordered acoustic signals Sc', Sd', Se', and an adder 26 for synthesizing (adding) the ordered acoustic signals Sc', Sd', Se' to thereby generate an acoustic signal Sb.

In this instance, the gain C table 24c, the gain D table 24d, and the gain E table 24e, respectively, are in the form of table data that individually define (cause changes in) the amplitudes of the ordered acoustic frequencies fc, fd, fe in accordance with the vehicle velocity v.

Moreover, the number of individual ordered acoustic frequencies fc, fd, fe is not limited to three, but may be selected to be a plurality of two or more, such as 4, 5, . . . 10 or more.

The active sound effect generating device 10 is further equipped with a vehicle acceleration generator 28 which generates the vehicle acceleration Δa by differentiating the vehicle velocity v, an amplitude data table (also referred to as a gain generator) 36 made up from a vehicle velocity gain table 30, an accelerator pedal gain table 32, and an acceleration gain table 34, a multiplier 38, and an adder 40.

Figure 2A:
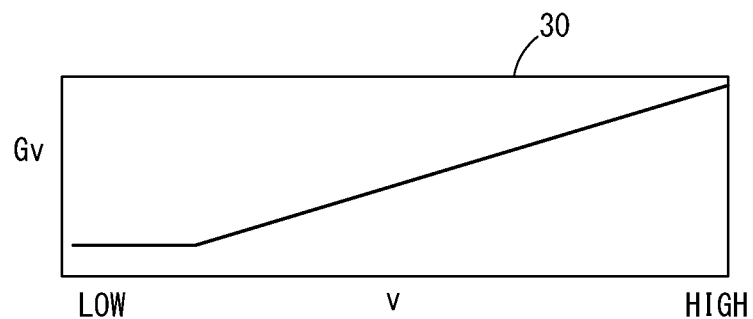
FIG. 2A is a map showing an example of a vehicle velocity gain table.
Figure 2B:
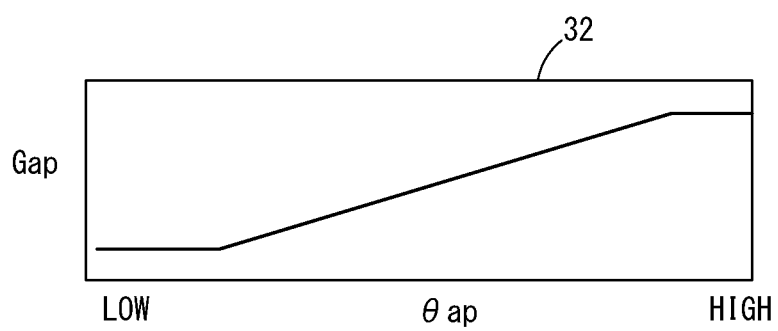
FIG. 2B is a map showing an example of an accelerator pedal gain table.
Figure 2C:
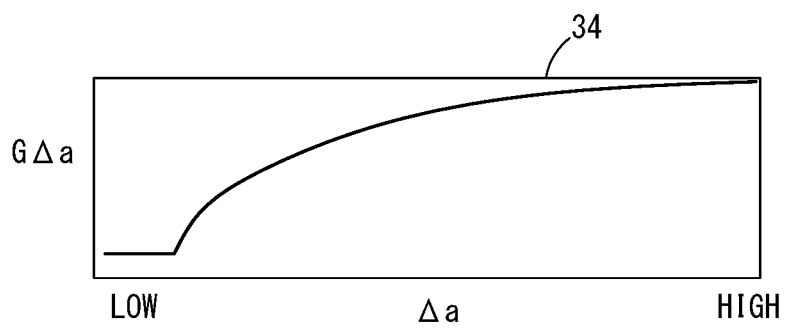
FIG. 2C is a map showing an example of an acceleration gain table.

FIG. 2A is a map (characteristic) showing an example of the vehicle velocity gain table 30, FIG. 2B is a map showing an example of the accelerator pedal gain table 32, and FIG. 2C is a map showing an example of the acceleration gain table 34.

The vehicle velocity gain table 30 is defined by a characteristic in which, with respect to the supplied vehicle velocity v, the vehicle velocity gain Gv which is output up to a low to medium velocity region is held constant, and the vehicle velocity gain Gv which is output from the low to medium velocity region to a high velocity region increases linearly.

The accelerator pedal gain table 32 is defined by a characteristic in which, with respect to the supplied accelerator degree of opening θap, the accelerator pedal gain (also referred to as an accelerator pedal degree of opening gain) Gap which is output up to the low to medium velocity region is held constant, the accelerator pedal gain Gap which is output from the low to medium velocity region to the medium to high velocity region increases linearly, and the accelerator pedal gain Gap which is output in the high velocity region is held constant.

The acceleration gain table 34 is defined by a characteristic in which, with respect to the supplied vehicle acceleration Δa, the acceleration gain GΔa which is output up to the low to medium velocity region is held constant, and the acceleration gain GΔa which is output from the low to medium velocity region to the high velocity region increases logarithmically.

The vehicle velocity gain Gv and the accelerator pedal gain Gap are multiplied by the multiplier 38, the acceleration gain GΔa is added by the adder 40 with respect to the multiplication result (product: Gv×Gap), and the addition result (sum: Gv×Gap+GΔa) is output as an adjusted gain Gs (Gs=Gv×Gap+GΔa).

Furthermore, the active sound effect generating device 10 is equipped with a gain amplifier 42 which is capable of adjusting the gain.

The gain amplifier 42 functions as a variable gain amplifier, which multiplies the gain of the acoustic signal Sb supplied from the adder 26 by the adjusted gain Gs supplied from the adder 40, to thereby generate the acoustic signal Sad and supply the acoustic signal Sad to the speaker 20.

[Configuration and Operation of Waveform Data Table 22]

The configuration and operation of a waveform data table 22 will now be described.

The waveform data table 22 comprises a fundamental frequency generation table 50 (also referred to as a vehicle velocity corresponding frequency generation table, or a fundamental vehicle velocity corresponding frequency generator, or a vehicle velocity corresponding frequency generator) for generating a fundamental vehicle velocity corresponding frequency (also referred to as a fundamental frequency, or a vehicle velocity corresponding frequency) fn on the basis of the vehicle velocity v, and an ordered acoustic signal generation table 52 made up from ordered acoustic signal generation tables (also referred to as ordered acoustic signal generators) 52c, 52d, 52e for generating acoustic signals Sc, Sd, Se having respective ordered acoustic frequencies fc, fd, fe from the fundamental frequency fn.

In FIG. 3, a map (characteristic) is shown of an example of the fundamental frequency generation table 50. The map may be considered as a characteristic diagram of the fundamental frequency generation table 50.

The horizontal axis is divided into four parts of the vehicle velocity v, from the vehicle velocity v=0 to the vehicle velocity v=v1, from the vehicle velocity v=v1 to the vehicle velocity v=v2, from the vehicle velocity v=v2 to the vehicle velocity v=v3, and from the vehicle velocity v=v3 to values greater than or equal to the vehicle velocity v=v3. According to the first embodiment, since the frequency rate of change adjustment coefficient k, as will be described later, is held constant with respect to the vehicle velocity v, the horizontal axis is equally divided by v1=v2−v1=v3−v2.

The vertical axis is defined by the fundamental frequency fn, over a range from the lower limit frequency Fmin to the upper limit frequency Fmax. In this case, the lower limit frequency Fmin is set to a low frequency that is greater than or equal to the lowest frequency of sound that can be output from the speaker 20, and the upper limit frequency Fmax is set to a high frequency that is less than or equal to an upper limit frequency at which it becomes difficult for a vehicle occupant to notice that sound is being output from the speaker 20. The lower limit frequency Fmin and the upper limit frequency Fmax are also influenced by the configuration of the vehicle compartment interior such as the vehicle structure, the seat position, and the like, and therefore, the respective values thereof are tuned for each type of vehicle.

In this instance, the fundamental frequency fn increases, for example, exponentially from the lower limit frequency Fmin of the vehicle velocity v=v1 to the upper limit frequency Fmax of the vehicle velocity v2.

The fundamental frequency fn is set to approximate a so-called Shepard infinite scale in which, for ranges of the vehicle velocity v from the vehicle velocity v=0 to v1, the vehicle velocity v=v2 to v3, and greater than or equal to the vehicle velocity v=v3, the same exponential increase is repeated as that of from the vehicle velocity v=v1 to v2.

More specifically, the fundamental frequency fn is calculated by the following expression (1), in which the base of the exponential function (the same as a later-described constant multiple) is defined by a (a>1), and the symbol "^" indicates exponentiation.

$$fn = Fmin \times a^{\{(v-V)/k\}}, \quad (1)$$

wherein if fn≥Fmax, then V→V+1 (0, v1, v2, or v3, . . . )

Moreover, in expression (1), since at each time, the fundamental frequency fn is calculated on the basis of the lower limit frequency Fmin, there is no need to return from the upper limit frequency Fmax to the lower limit frequency Fmin.

However, the following definitions hold true, i.e., fn indicates the fundamental frequency (fundamental vehicle velocity corresponding frequency), Fmin indicates a lower limit frequency, a indicates a constant multiple, v indicates the vehicle velocity, V: V=0, v1, v2, v3, and indicates the vehicle velocity at which the fundamental frequency fn becomes the upper limit frequency Fmax, and k indicates a frequency rate of change adjustment coefficient, wherein k>0, and according to the first embodiment, k is a constant. In this manner, the fundamental frequency fn is an exponential function of the vehicle velocity v with the vehicle velocity v serving as a variable, and with the remaining terms Fmin, a, V, Fmax, and k serving as parameters.

Figure 4:
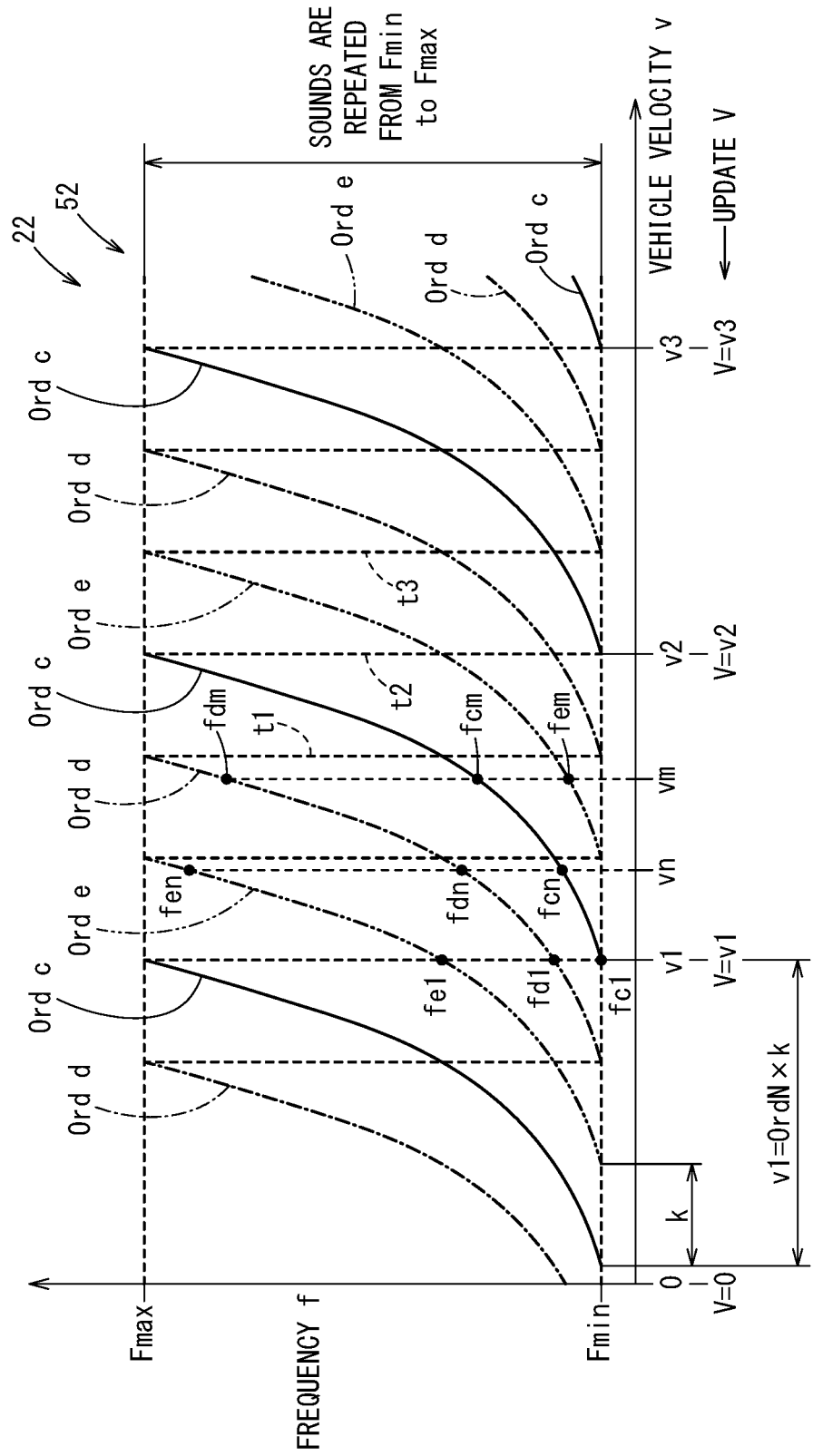
FIG. 4 is a characteristic diagram for explaining the configuration and operation of the fundamental frequency generation table and an ordered acoustic signal generation table.

FIG. 4 is a characteristic diagram for explaining the configuration and operation of the fundamental frequency generation table 50 and the ordered acoustic signal generation table 52, and more specifically, is a characteristic diagram for explaining the configuration and operation of the waveform data table 22.

As can be appreciated from FIG. 4, the frequency rate of change adjustment coefficient k defines a period (vehicle velocity interval) at which the frequency configuration of the sound effect is repeated in a physical sense. The value of the frequency rate of change adjustment coefficient k is set on the basis of the vehicle velocity v.

In FIG. 4, for example, although the magnitude relationships of the frequency f of the order c (Ord c), the order d (Ord d), and the order e (Ord e) are interchanged at times t1, t2, and t3, the configuration thereof is of a manner in which the frequency components Fmin, Fmin×a, and Fmin×a^2 are the same.

In this instance, the vehicle velocity intervals at times t1, t2, and t3 are defined by the frequency rate of change adjustment coefficient k. As the frequency rate of change adjustment coefficient k is larger, the vehicle velocity interval until returning to the same frequency configuration becomes larger, and the frequency rate of change becomes smaller.

For example, in the case of k=20, the frequency configuration of the sound effect becomes the same at each increment of 20 [km/h]. In this case, the frequency configuration, which changes from the lower limit frequency Fmin to the upper limit frequency Fmax, is set so as to be repeated with each increment of 20 [km/h] {refer to the above expression (1)}.

Further, with respect to one degree, the vehicle velocity interval (v1, v2−v1) when the upper limit frequencies Fmax become equivalent is defined by OrdN×k. OrdN is the number of ordered frequencies, and in the example shown in FIG. 4, with Ord c, Ord d, and Ord e, the number of ordered frequencies OrdN=3.

As shown in FIG. 4, at a time that the vehicle velocity v is v=v1, in the ordered acoustic signal generation table 52c, when the ordered acoustic signal Sc=Sc1 having the ordered acoustic frequency fc of the order c (Ord c) is generated, referring to the fundamental frequency fn (also refer to FIG. 3), the ordered acoustic frequency fc=fc1=Fmin is generated, and thereafter, the ordered acoustic signal Sc1 of a constant amplitude having the ordered acoustic frequency fc1 is generated.

Further, at a time that the vehicle velocity v is v=v1 in the ordered acoustic signal generation table 52d, when the ordered acoustic signal Sd=Sd1 having the ordered acoustic frequency fd1 of the order d (Ord d) is generated, the ordered acoustic frequency fc=fc1 is multiplied by a and generated (fd1=a×fc1=a×Fmin). Additionally, the ordered acoustic signal Sd1 of a constant amplitude having the ordered acoustic frequency fd1 is generated.

Further, at a time that the vehicle velocity v is v=v1, in the ordered acoustic signal generation table 52e, when the ordered acoustic signal Se=Se1 having the ordered acoustic frequency fe1 of the order e (Ord e) is generated, the ordered acoustic frequency fc=fc1 is multiplied by a^2 and generated (fe1=a×a×fc1=fc1×a^2=Fmin×a^2). Additionally, the ordered acoustic signal Sd1 of a constant amplitude having the ordered acoustic frequency fd1 is generated.

Similarly, as shown in FIG. 4, at a time that the vehicle velocity v is v=vn, in the ordered acoustic signal generation table 52c, when the ordered acoustic signal Sc=Scn having the ordered acoustic frequency fc of the order c (Ord c) is generated, referring to the fundamental frequency fn (also refer to FIG. 3), the ordered acoustic frequency fc=fcn is generated, and thereafter, the ordered acoustic signal Scn of a constant amplitude having the ordered acoustic frequency fcn is generated.

Further, at a time that the vehicle velocity v is v=vn, in the ordered acoustic signal generation table 52d, when the ordered acoustic signal Sd=Sdn having the ordered acoustic frequency fdn of the order d (Ord d) is generated, the ordered acoustic frequency fc=fcn is multiplied by a and generated (fdn=a×fcn). Additionally, the ordered acoustic signal Sdn of a constant amplitude having the ordered acoustic frequency fdn is generated.

Furthermore, at a time that the vehicle velocity v is v=vn, in the ordered acoustic signal generation table 52e, when the ordered acoustic signal Se=Sen having the ordered acoustic frequency fen of the order e (Ord e) is generated, the ordered acoustic frequency fc=fcn is multiplied by a^2 and generated (fen=a×a×fcn=fcn×a^2). Additionally, the ordered acoustic signal Sdn of a constant amplitude having the ordered acoustic frequency fen is generated.

Although slightly in greater detail, to explain somewhat more for the sake of caution, in a similar manner, as shown in FIG. 4, at a time that the vehicle velocity v is v=vm, in the ordered acoustic signal generation table 52c, when the ordered acoustic signal Sc=Scm having the ordered acoustic frequency fc of the order c (Ord c) is generated, referring to the fundamental frequency fn (also refer to FIG. 3), the ordered acoustic frequency fc=fcm is generated, and thereafter, the ordered acoustic signal Scm of a constant amplitude having the ordered acoustic frequency fcm is generated.

Further, at a time that the vehicle velocity v is v=vm, in the ordered acoustic signal generation table 52d, when the ordered acoustic signal Sd=Sdm having the ordered acoustic frequency fdm of the order d (Ord d) is generated, the ordered acoustic frequency fc=fcm is multiplied by a and generated (fdm=a×fcm). Additionally, the ordered acoustic signal Sdm of a constant amplitude having the ordered acoustic frequency fdm is generated.

Furthermore, at a time that the vehicle velocity v is v=vm, in the ordered acoustic signal generation table 52e, when the ordered acoustic signal Se=Sem having the ordered acoustic frequency fem of the order e (Ord e) is generated, although fem=fcm×a^2, the value of fem=fcm×a^2 becomes fem Fmax. At this time, since fem becomes fem=fem/(a^OrdN), fem becomes fem=fem/a^3, and further becomes fem=fcm× a^2/a^3=fcm/a. As a result, since according to the first embodiment, OrdN=3, when the ordered acoustic frequency fem is generated, it may be generated by multiplying the ordered acoustic frequency fcm by 1/a. Additionally, the ordered acoustic signal Sdm of a constant amplitude having the ordered acoustic frequency fem is generated.

In this manner, the frequency ratios of each of the ordered components always become equal to the constant multiple a, in a manner so that the ordered acoustic signals (fc1, fd1, fe1), (fcn, fdn, fen), and (fcm, fdm, fem) are as shown in the following expression (2). Moreover, in particular, in the case that a=2, the ordered acoustic frequencies fc1, fd1, fe1, fcn, fdn, fen, fcm, fdm, fem of the ordered components are rendered in the form of harmonics (2 times, 4 times, . . . ).

$$fc1{:}fd1{:}fe1{=}fcn{:}fdn{:}fen{=}fem{:}fcm{:}fdm{=}$$
$$1{:}a{:}a^{\wedge}(\text{Ord}N{-}1) \qquad (2)$$

In the case of the first embodiment, since OrdN=3, the resultant values thereof are 1:2:4.

In this manner, in the waveform data table 22, in accordance with the ordered acoustic signal generation tables 52c, 52d, 52e, the ordered acoustic signals Sc, Sd, Se having the ordered acoustic frequencies fc, fd, fe, each of which are vehicle velocity corresponding frequencies, are generated from the fundamental frequency fn that was generated by the fundamental frequency generation table 50 on the basis of the vehicle velocity v.

Next, a computational example of a detailed numerical example will be described.

It will be assumed that, in expression (1), the following values are assigned, namely, a=2, Fmin=60 [Hz], OrdN=3, Fmax=Fmin×a^OrdN=60×2^3=480 [Hz], and k=20 [km/h].

1. In the case that the vehicle velocity v is v=k=20 [km/h], with the fundamental frequency fn being fn=Fmin×2^{(20−0)/20}=120 [Hz], the ordered acoustic frequency fe of Ord e becomes fe=fn×2^2=480 [Hz]=Fmax.

Immediately thereafter, fe=fe/(a^OrdN)=60 [Hz]=Fmin, and the ordered acoustic frequency fe is returned in the direction of the lower limit frequency Fmin.

At this time, the frequency configuration of the sound becomes the same as when 0 [km/h], with 60 [Hz] (Ord e), 120 [Hz] (Ord c), and 240 [Hz] (Ord d). In this manner, the sound effect is repeated at the vehicle velocity interval of the frequency rate of change adjustment coefficient k.

2. When the vehicle velocity v is v=v1=k×OrdN, the following values, namely, V=0 [km/h] and fn=Fmin×2^{(60−0)/20}=480 [Hz]=Fmax, are produced from expression (1).

In this manner, over the interval of v=k×OrdN, the fundamental frequency fn undergoes a change from the lower limit frequency Fmin to become the upper limit frequency Fmax. In this instance, although fn=fc, when fn=fd and fn=fe as well, the fundamental frequency fn becomes the upper limit frequency Fmax over the same vehicle velocity interval.

3. Immediately thereafter, V becomes V=v1=60 [km/h], fn becomes fn=Fmin×2^{(60−60)/20}=Fmin, and the fundamental frequency fn is returned to the lower limit frequency Fmin.

4. When v2=120 [km/h], the following values, namely, V=60 [km/h] and fn=Fmin×2^{(120−60)/20}=480 [Hz]=Fmax, are produced. In this manner, over the interval (v2−v1) of v=k×OrdN, the fundamental frequency fn undergoes a change from the lower limit frequency Fmin to become the upper limit frequency Fmax.

[Overall Operation of First Embodiment]

In the active sound effect generating device 10 which is constituted from the acoustic control ECU, on the basis of a sampling clock, the acoustic signal Sad is generated (controlled) in relation to an infinite scale based on the vehicle velocity v, within an extremely short time period on the order of milliseconds. The object of such a control is (the CPU of) the acoustic control ECU.

When the accelerator pedal 106 of the vehicle 12, which is either stopped or traveling at a constant velocity, is depressed by the driver, the motor 100 is rotationally driven through the motor ECU 104, and in accordance with being rotationally driven, the vehicle wheels 102 are rotated through the axle 101, whereby the vehicle 12 undergoes acceleration.

During acceleration thereof, the vehicle velocity v is detected by the vehicle velocity sensor 16. In accordance with the detected vehicle velocity v, and referring to the waveform data table 22, for example, during a period in which the vehicle velocity v is v=0 to v1, the fundamental frequency fn is generated by the fundamental frequency generation table 50 (see FIG. 3), and on the basis of the generated fundamental vehicle velocity corresponding frequency fn, the ordered acoustic signals Sc, Sd, Se {expression (2)} are generated with reference to the ordered acoustic signal generation tables 52c, 52d, 52e.

The amplitudes of the generated ordered acoustic signals Sc, Sd, Se are adjusted (gain multiplied) by referring to an amplitude data table 24, whereupon the ordered acoustic signals Sc', Sd', Se' are generated, and are synthesized by the adder 26 to thereby generate the acoustic signal Sb. The generated acoustic signal Sb is supplied to an input terminal of the gain amplifier 42.

Below, in a similar manner, in accordance with the characteristics of the waveform data table 22 (ordered acoustic signal generation table 52) shown in FIG. 4, which is calculated in accordance with expression (1), with respect to an increase in the vehicle velocity v, the acoustic signal Sb, which is composed of the plurality of ordered acoustic signals Sc, Sd, Se that are repeated at the lower limit frequency Fmin and the upper limit frequency Fmax, is supplied to the input terminal of the gain amplifier 42.

In parallel with the operation of generating the acoustic signal Sb from the waveform data table 22 and the amplitude data table 24, from the vehicle velocity v, the acceleration Δa, which is generated by the vehicle acceleration generator 28 on the basis of the vehicle velocity v, and the accelerator pedal degree of opening θap, and while referring respectively to the vehicle velocity gain table 30 (FIG. 2A), the acceleration gain table 34 (FIG. 2C), and the accelerator pedal gain table 32 (FIG. 2B), and furthermore by the multiplier 38 and the adder 40, the adjusted gain Gs (Gs=Gv×Gap+GΔa) for enhancing the acoustic signal Sb is generated and supplied to a gain adjustment terminal of the gain amplifier 42.

The gain (amplitude) of the acoustic signal Sb is adjusted (increased during the course of acceleration of the vehicle 12) by the adjusted gain Gs, and the adjusted acoustic signal Sad is supplied to the speaker 20.

Consequently, for example, as shown in FIG. 4, with respect to an increase in the vehicle velocity v, from the speaker 20 into the vehicle compartment interior, it is possible to generate sound effects in which there are synthesized three sound effects, i.e., three sound effects at a so-called infinite scale, which are audible from the three acoustic frequencies fc, fd, fe that are repeated at the lower limit frequency Fmin and the upper limit frequency Fmax. As a result, corresponding to an increase in the vehicle velocity v, it is possible to generate sound effects which exhibit a high sense of realism as automotive running sounds.

Advantageous Effects of the First Embodiment

Advantageous effects of the above-described first embodiment will be described in comparison with a comparative example.

Figure 5:
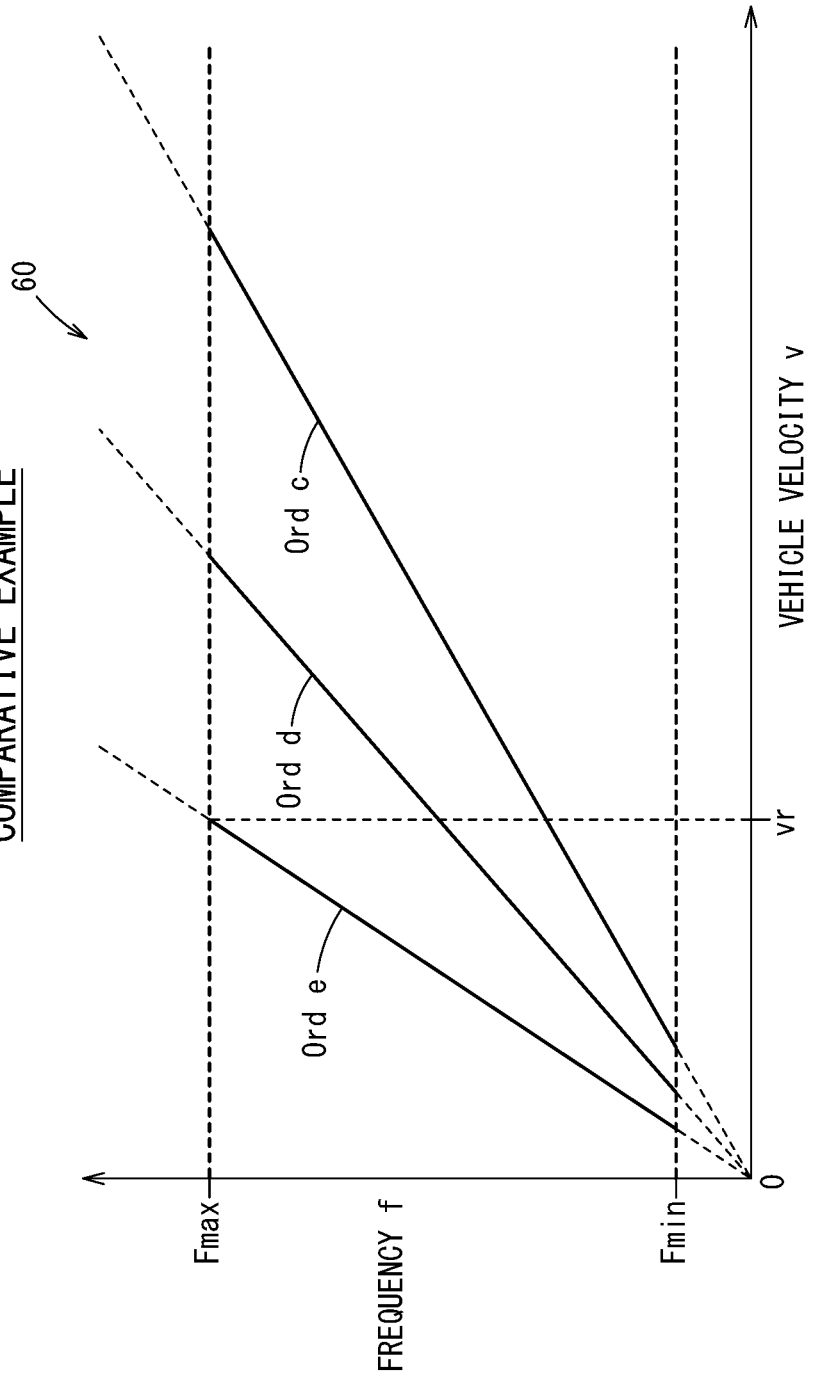
FIG. 5 is a waveform data table of vehicle velocity versus frequency according to a comparative example.

In FIG. 5, a waveform data table (referred to as a comparative example waveform data table) 60 of the vehicle velocity v versus the frequency f according to the comparative example is shown.

Generally, the frequency range that can be reproduced without impairing the sense of realism of the sound effects lies between the lower limit frequency Fmin and the upper limit frequency Fmax, based on the directivity of the speaker 20 and the vehicle compartment interior.

In the comparative example shown in FIG. 5, the frequency f can be generated in accordance with f=K×v (the constant K and the vehicle velocity v), with reference respectively to the characteristic Ord c of a lower order, the characteristic Ord d of an intermediate order, and the characteristic Ord e of a higher order.

In the comparative example, assuming that the frequency range is composed of frequencies lying within a usable range, first, the lower order characteristic Ord c is capable of generating sound effects over a wide vehicle velocity range, however, the amount of change in the frequency with respect to the amount of change in the vehicle velocity is small. Secondly, the higher order characteristic Ord e produces a large amount of change in the frequency with respect to the amount of change in the vehicle velocity, however, the vehicle velocity range within which sound effects can be generated is narrow. As a result, the range of vehicle velocities v within which the sense of realism of the sound effects is not impaired is a narrow range up to the vehicle velocity vr.

In contrast thereto, according to the first embodiment, as shown in FIG. 4, by utilizing the concept of an infinite scale, and repeatedly generating sound effects in which the frequency ratio of the respective ordered components of the plurality of ordered acoustic frequencies fc, fd, fe at the same vehicle velocity v is always kept at the constant a within the prescribed frequency range of Fmin to Fmax, even if only sounds in a comparatively low frequency region are used, it becomes possible to generate acceleration sound effects that do not produce a feeling of discomfort in accordance with the vehicle velocity v and the vehicle acceleration Δa, and thus the aforementioned problems are resolved.

More specifically, in accordance with the active sound effect generating device 10 according to the first embodiment, even if the sound effects that are generated corresponding to an increase in the vehicle velocity v take place within a high velocity region of the vehicle velocity v, it is possible to maintain a high level of realism (a natural feeling) as automotive running sounds.

Modified Example

In the first embodiment described above, the fundamental frequency (fundamental vehicle velocity corresponding frequency) fn with respect to the vehicle velocity v is generated with reference to the fundamental frequency generation table 50 shown in FIG. 3. In this case, in the aforementioned expression (1), each of the parameters of the lower limit frequency Fmin, the upper limit frequency Fmax, and the frequency rate of change adjustment coefficient k are in the form of constants, respectively.

In the second and third embodiments, to be described later, examples are shown in which these parameters (Fmin, Fmax, k) are treated as variables, whereby the fundamental frequency fn is changed as a function of the vehicle velocity v.

The modified example is a technique in which, even if these parameters are changed, it is possible to continuously calculate the fundamental frequency fn.

Moreover, the modified example (calculation of the fundamental vehicle velocity corresponding frequency fn by way of a numerical expression) can also be used in the first embodiment in which the parameters are constants.

Figure 6:
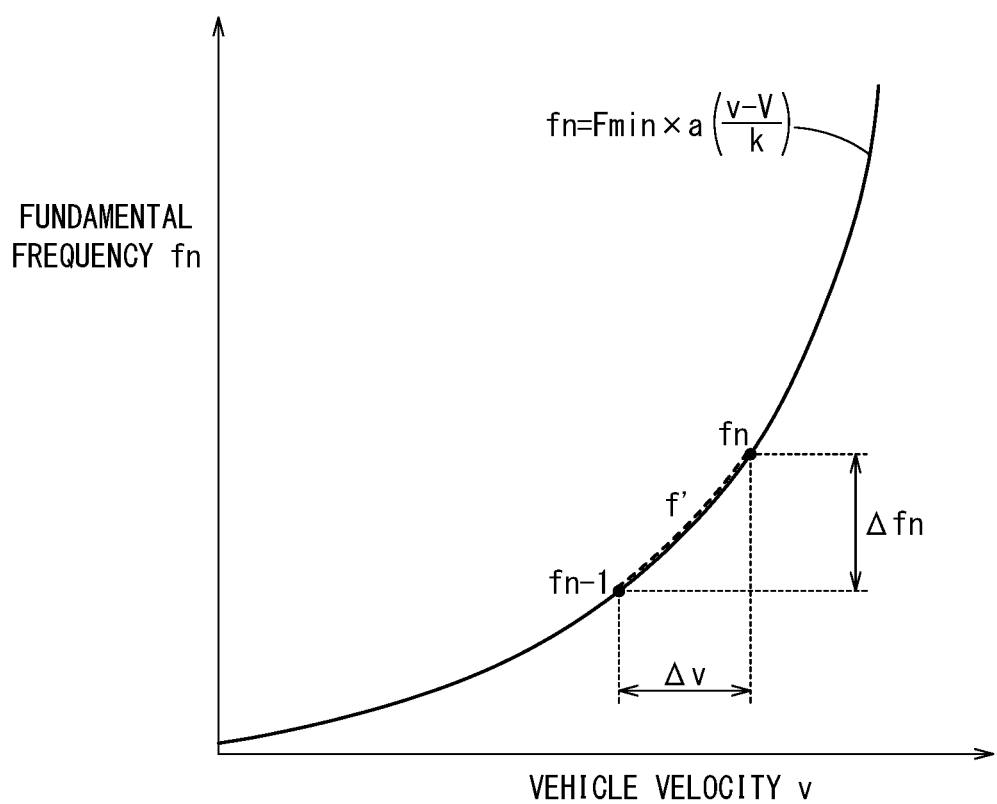
FIG. 6 is an explanatory diagram of an algorithm of a fundamental vehicle velocity corresponding frequency generator according to a modified example.

FIG. 6 is an explanatory diagram of an algorithm of a fundamental vehicle velocity corresponding frequency generator (fundamental frequency generation table) 50A according to the modified example.

Although the fundamental vehicle velocity corresponding frequency fn is calculated as shown in expression (1), as shown in FIG. 6, in the case that the fundamental vehicle velocity corresponding frequency of one sampling time prior is defined by fn−1, and the amount of change in the vehicle velocity Δv at the current sampling time is sufficiently small, then the curve between the current fundamental vehicle velocity corresponding frequency fn and the fundamental vehicle velocity corresponding frequency of one sampling time prior fn−1 can be approximated by a straight line.

When such an approximation is made, the amount of change in the frequency Δfn can be calculated by the following equation (3), in which f′ is a derivative value obtained by differentiating the exponential function of the equation (1) by the vehicle velocity v.

$$\Delta fn = f' \times \Delta v \quad (3)$$
$$= \{(\log a)/k\} \times Fmin \times a^{\{(v-V)/k\}} \times \Delta v$$

By calculating the amount of change in the frequency Δfn, the current fundamental vehicle velocity corresponding frequency fn can be calculated sequentially by the following equation (4), using the fundamental vehicle velocity corresponding frequency of one sampling time prior fn−1, and the amount of change in the frequency Δfn at the one sampling time.

$$fn = fn-1 + \Delta fn \quad (4)$$

Thus, in the modified example, when the vehicle velocity v is v=0 to v1, v=v2 to v3, or greater than or equal to v=v3, and the base of the exponential function (which is the same as the constant multiple, to be described later) is defined by a (a>1), the fundamental vehicle velocity corresponding frequency fn can be calculated by the following expression (5), in which the symbol ^ indicates exponentiation.

$$fn=fn-1+\Delta fn, \text{ and}$$
$$\Delta fn=\{(\log a)/k\} \times Fmin \times a^{\{(v-V)/k\}} \times \Delta v, \quad (5)$$

wherein if fn≥Fmax, then V→V+1 (0, v1, v2, or v3, . . . ), and fn−4 Fmin

According to the modified example, since in accordance with successive calculations, the fundamental vehicle velocity corresponding frequency fn increases accompanying acceleration, it should be borne in mind that when fn becomes Fmax, it is necessary for fn to be returned to Fmin.

However, the following definitions hold true, i.e., fn indicates the fundamental vehicle velocity corresponding frequency (vehicle velocity corresponding frequency), Fmin indicates the lower limit frequency, a indicates the constant multiple, v indicates the vehicle velocity, V: V=0, v1, v2, v3, and indicates the vehicle velocity at which the fundamental frequency fn becomes the upper limit frequency Fmax, and k indicates the frequency rate of change adjustment coefficient. Moreover, upon using the expressions (3) and (4), the vehicle velocity intervals, for example, v3−v2 and v2−v1, need not necessarily be equal.

In the above-described first embodiment, although the parameters can be changed, the frequencies generated due to such a change in parameters may be discontinuous, and in such a case, an acoustical sense of discomfort occurs. In contrast thereto, as an advantage of the sequential calculations according to the modified example, since the frequencies are continuously calculated, it is possible to eliminate any acoustical sense of discomfort when the parameters are changed.

Second Embodiment

In a second embodiment to which the above-described modified example is applied, in comparison with the first embodiment, in order that the feeling of acceleration can be enjoyed more, when the vehicle velocity v increases, the fundamental frequency fn is subjected to processing in a manner so that the upper limit frequency Fmax or the lower limit frequency Fmin becomes larger.

In order to realize this feature, an active sound effect generating device 10A (see FIG. 1) according to the second embodiment differs from the active sound effect generating device 10 according to the first embodiment, in that the waveform data table 22 is replaced by a waveform data table 22A.

Figure 7A:
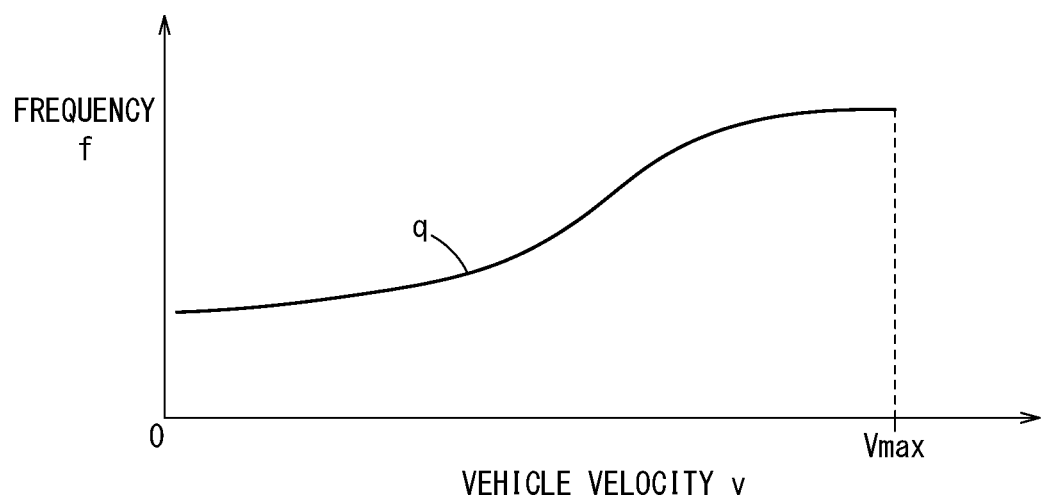
FIGS. 7A and 7B are explanatory diagrams of waveform data tables according to a second embodiment in which an upper limit frequency or a lower limit frequency is increased with respect to an increase in the vehicle velocity.
Figure 7B:
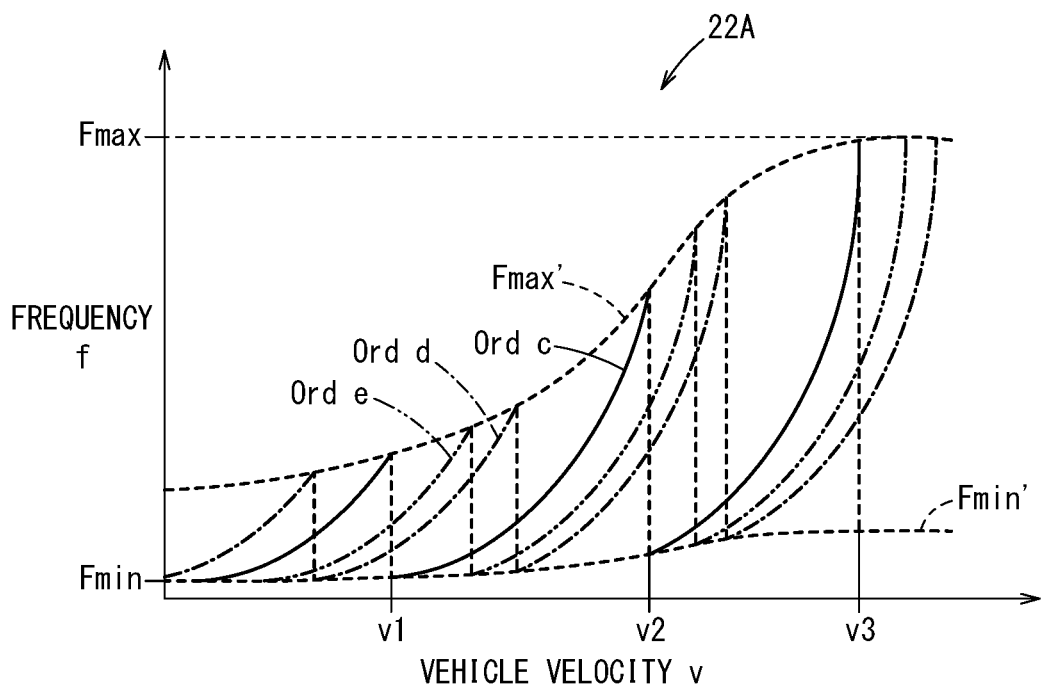

In the waveform data table 22A of the second embodiment shown in FIG. 7B, from a characteristic q of the frequency change with respect to the vehicle velocity v shown in FIG. 7A, the upper limit frequency Fmax' (or the lower limit frequency Fmin') of the frequency f with respect to an increase in the vehicle velocity v is set so as to become minimum when the vehicle velocity v is v=0, to increase in a S-shaped curved manner as the vehicle velocity v increases, and to become maximum at the high vehicle velocity Vmax.

Moreover, according to the second embodiment, since the lower limit frequency Fmin' or the upper limit frequency Fmax', which is a parameter, is made to change in accordance with the vehicle velocity v, the fundamental frequency fn can be continuously calculated by the above-described expression (5) of the modified example.

In the foregoing manner, with the active sound effect generating device 10A according to the second embodiment, when the vehicle velocity v increases, in order that the feeling of acceleration can be enjoyed more, the range of frequencies is capable of being set so as to be wider on the side of a high vehicle velocity v than on the side of a low vehicle velocity v.

More specifically, even if parameters such as the frequency rate of change adjustment coefficient k and the upper limit frequency Fmax are switched depending on the vehicle velocity v, the frequency of the sound effects can be continuously changed by successive updating thereof.

According to the second embodiment, by utilizing the concept of an infinite scale, and repeatedly generating sound effects within a characteristic in which the lower limit frequency Fmin' or the upper limit frequency Fmax' is made to change in accordance with the vehicle velocity v, even if only sound effects in a comparatively low frequency region are used, it is possible to generate acceleration sound effects that do not produce a feeling of discomfort in accordance with the vehicle velocity v and the vehicle acceleration Δa.

In actuality, a relationship exists by which Fmax=Fmin× a^OrdN (a^OrdN is a determined parameter), and therefore, for example, when on the one hand the upper limit frequency Fmax is changed to the upper limit frequency Fmax', the lower limit frequency Fmin' undergoes a change based on such a relationship. To explain in greater detail, if one of the upper limit frequency Fmax and the lower limit frequency Fmin is defined in a manner so as to increase nonlinearly (the increase may also be linear) in accordance with an increase in the vehicle velocity V as with the characteristic q shown in FIG. 7A, then as shown in FIG. 7B, on the basis of the above-described relationship, the other of the upper limit frequency Fmax' and the lower limit frequency Fmin' also increases nonlinearly in accordance with the increase in the vehicle velocity V.

As a result, it is possible to maintain a high level of realism (a natural feeling) as automotive running sounds, even if the sound effects, which are generated in accordance with an increase in the vehicle velocity v, occur within a high velocity region.

Third Embodiment

In the third embodiment, in comparison with the first embodiment, in order that the feeling of acceleration can be enjoyed more, when the vehicle velocity v increases, the vehicle velocity corresponding frequency fn is subjected to processing in a manner so that the amount of change in the frequency with respect to the increase in the vehicle velocity v ($\Delta f/\Delta v$) becomes larger.

In order to realize this feature, an active sound effect generating device 10B (see FIG. 1) according to the third embodiment differs from the active sound effect generating device 10 according to the first embodiment, in that the waveform data table 22 is replaced by a waveform data table 22B.

Figure 8A:
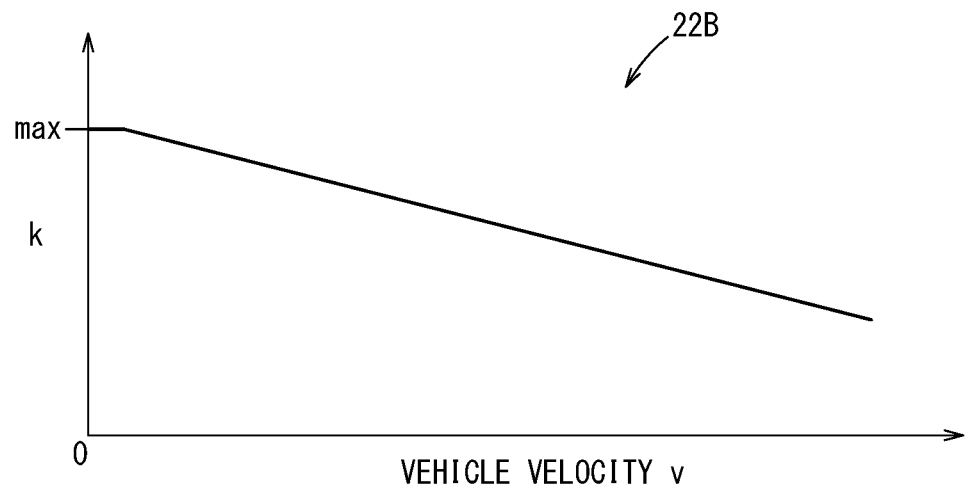
FIGS. 8A and 8B are explanatory diagrams of waveform data tables according to a third embodiment.

As shown in FIG. 8A, in the waveform data table 22B, the frequency rate of change adjustment coefficient k of the above-described expression (1) is set in a manner so that a maximum value max thereof is taken when the vehicle velocity v=0, and the frequency rate of change adjustment coefficient k decreases accompanying an increase in the vehicle velocity v.

Figure 8B:
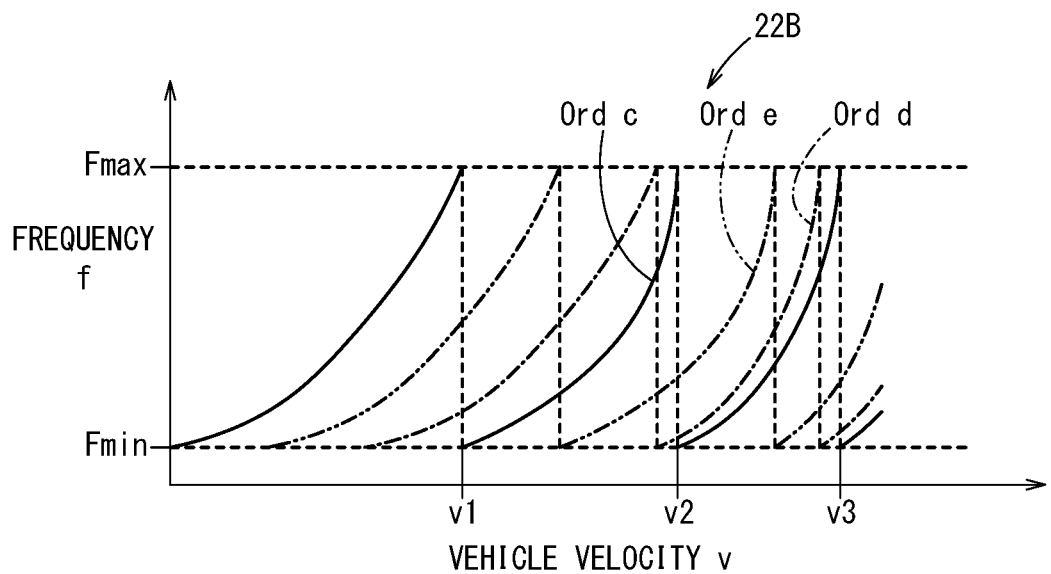

When set in this manner, as shown in FIG. 8B, in the waveform data table 22B of the third embodiment, the amount of change in the frequency f can be continuously increased with respect to the increase in the vehicle velocity v.

Moreover, according to the third embodiment, since the frequency rate of change adjustment coefficient k, which is a parameter, is made to change in accordance with the vehicle velocity v, the fundamental vehicle velocity corresponding frequency fn is calculated by the above-described expression (5) of the modified example.

In the foregoing manner, with the active sound effect generating device 10B (see FIG. 1) according to the third embodiment, when the vehicle velocity v increases, in order that the feeling of acceleration can be enjoyed more, the amount of change in the frequency ($\Delta f/\Delta v$) is capable of being set so as to be greater on the side of a high vehicle velocity v than on the side of a low vehicle velocity v.

More specifically, since the frequency rate of change adjustment coefficient k is made smaller corresponding to an increase in the vehicle velocity v, the amount of change in the vehicle velocity corresponding frequency fn with respect to the increase in the vehicle velocity v (frequency increment/vehicle velocity increment) can be made greater, and thus it is possible to enhance the sense of realism as automotive running sounds.

Moreover, the frequency rate of change adjustment coefficient k need not necessarily be reduced in a uniform manner in accordance with the increase in the vehicle velocity v as shown in FIG. 8A, but may be controlled on the basis of the vehicle velocity v, while taking into consideration the actual vehicle environment (changes in road surface conditions such as wetness, dryness, poor roads or the like, the environmental temperature, the atmospheric pressure, the suspension) and the like. In this case as well, it is preferable to control (tune) the amount of change in the vehicle velocity corresponding frequency fn with respect to changes in the vehicle velocity v, in a manner so that the sound effects can be heard smoothly while confirming the sense of realism thereof as automotive running sounds.

Fourth Embodiment

The fourth embodiment is capable of being applied to the first embodiment and the third embodiment, in which the upper limit frequency Fmax and the lower limit frequency Fmin are constant and do not change with respect to the increase in the vehicle velocity v. According to the fourth embodiment, an inverse characteristic of a sound field characteristic of the vehicle compartment is reflected, whereby during acceleration, it is possible to realize the generation of smooth sound effects at the position of the vehicle occupant's ears.

Figure 9:
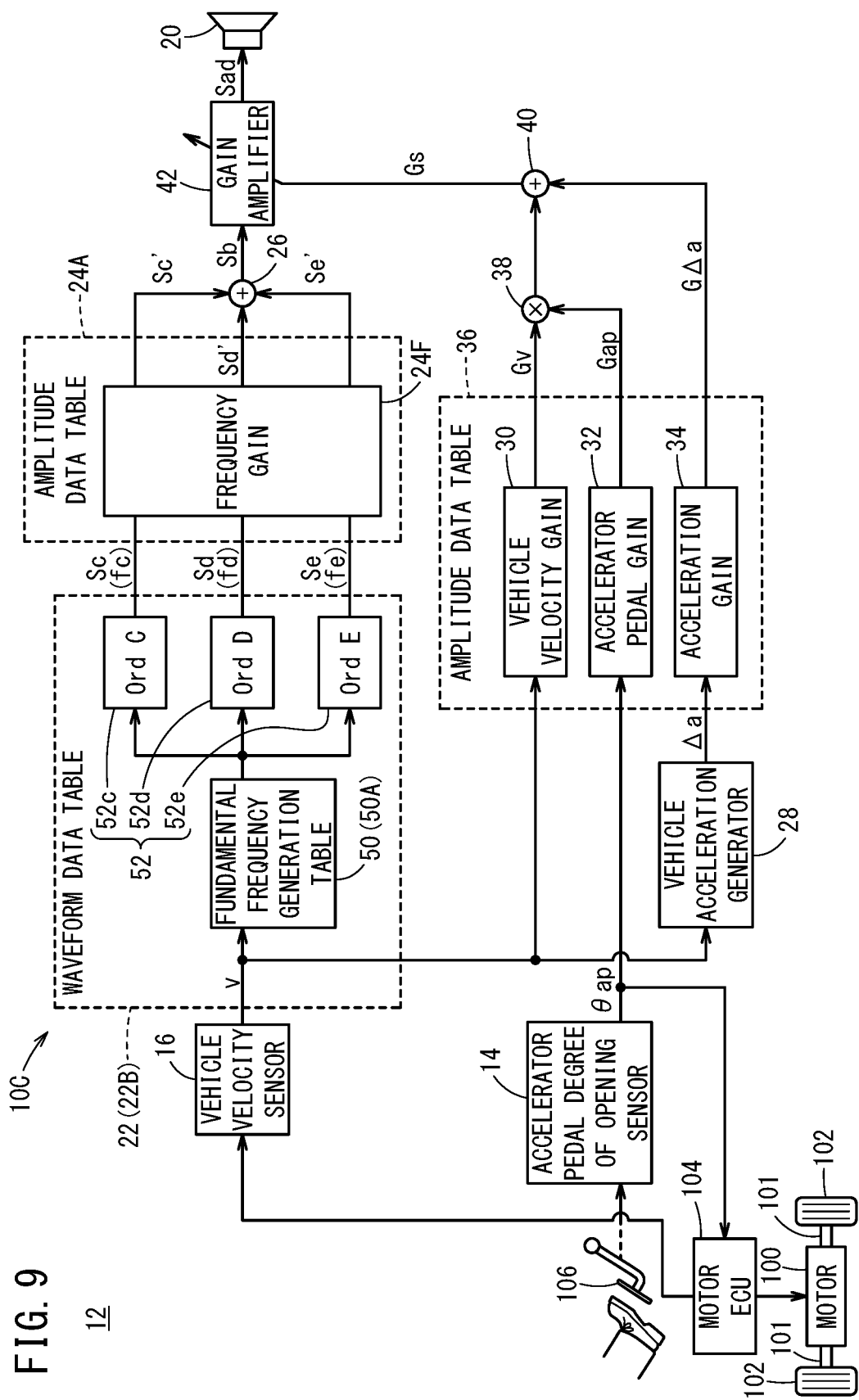
FIG. 9 is a block diagram showing a schematic configuration of a vehicle in which there is installed an active sound effect generating device according to a fourth embodiment.

In order to realize this feature, as shown in FIG. 9, in an active sound effect generating device 10C according to the fourth embodiment, the amplitude data table 24 (see FIG. 1), which is made up from the gain C table 24c, the gain D table 24d, and the gain E table 24e of the first and third embodiments, is replaced by an amplitude data table 24A which is made up from a single frequency gain table 24F.

FIG. 10A shows an example of creating the frequency gain table 24F. The characteristic of a gain G (gain characteristic) 200 shown on the left side of FIG. 10A is a characteristic in which the gain G changes in the form of a bell curve between the lower limit frequency Fmin and the upper limit frequency Fmax.

In addition, in the characteristic of a gain G (gain characteristic) 202 shown on the right side of FIG. 10A, an inverse characteristic of the sound field characteristic inside the vehicle compartment is shown with respect to changes in the frequency f.

By multiplying the characteristic 200 and the characteristic 202 at each frequency f, a characteristic 204 of the frequency gain table 24F can be created, as shown on the left side of the vertical axis (frequency f axis) in FIG. 10B.

When utilizing the frequency gain table 24F, by way of the waveform data table 22 (FIG. 4) or the waveform data table 22B (FIG. 8B) corresponding to the increase in the vehicle velocity v, and to explain with reference to the vehicle velocity vs. frequency characteristic which is shown on the right side of the vertical axis in FIG. 10B (the waveform data table 22 of FIG. 4 is shown schematically), ordered acoustic signals Sc, Sd, Se having the ordered acoustic frequencies fc, fd, fe are generated in accordance with the vehicle velocity v. The amplitudes (gain G) of the generated ordered acoustic signals Sc, Sd, Se are determined from the characteristic (frequency gain characteristic) 204 of the gain G (see FIG. 10B) corresponding to the frequency f of the ordered acoustic frequencies fc, fd, fe, whereupon the acoustic signals Sc', Sd', Se' are generated.

With the active sound effect generating device 10C (FIG. 9) according to the fourth embodiment which is generated in the foregoing manner, the inverse characteristic 202 of the sound field characteristic of the vehicle compartment is reflected in the generation of the sound effects, and therefore, sound effects are generated that are increased more smoothly at the position of the vehicle occupant's ears.

Further, in the gain characteristic 200, the gain G in the vicinity of the lower limit frequency Fmin and the upper limit frequency Fmax is set so as to be small, and therefore, it is possible to generate sound effects that are not sensed at a time that the sound effects are switched.

Stated otherwise, when the upper limit frequency Fmax is switched to the lower limit frequency Fmin in accordance with an increase in the vehicle velocity v, the sound effects can be switched smoothly, naturally, and without a sense of discomfort.

Fifth Embodiment

The fifth embodiment provides technical content in which the concept of the fourth embodiment is partially incorporated in the second embodiment that was described with reference to the waveform data table 22A of FIG. 7B.

More specifically, according to the fifth embodiment, technical content is provided in which the lower limit frequency Fmin is held constant with respect to the vehicle velocity v, and similar to the second embodiment, in the case that the upper limit frequency Fmax is made to increase in the same manner as the upper limit frequency Fmax' shown in FIG. 7B, the gain G at the upper limit frequency Fmax' and the lower limit frequency Fmin is made small, whereby sound effects are generated that are not sensed at a time that the sound effects are switched.

Figure 11:
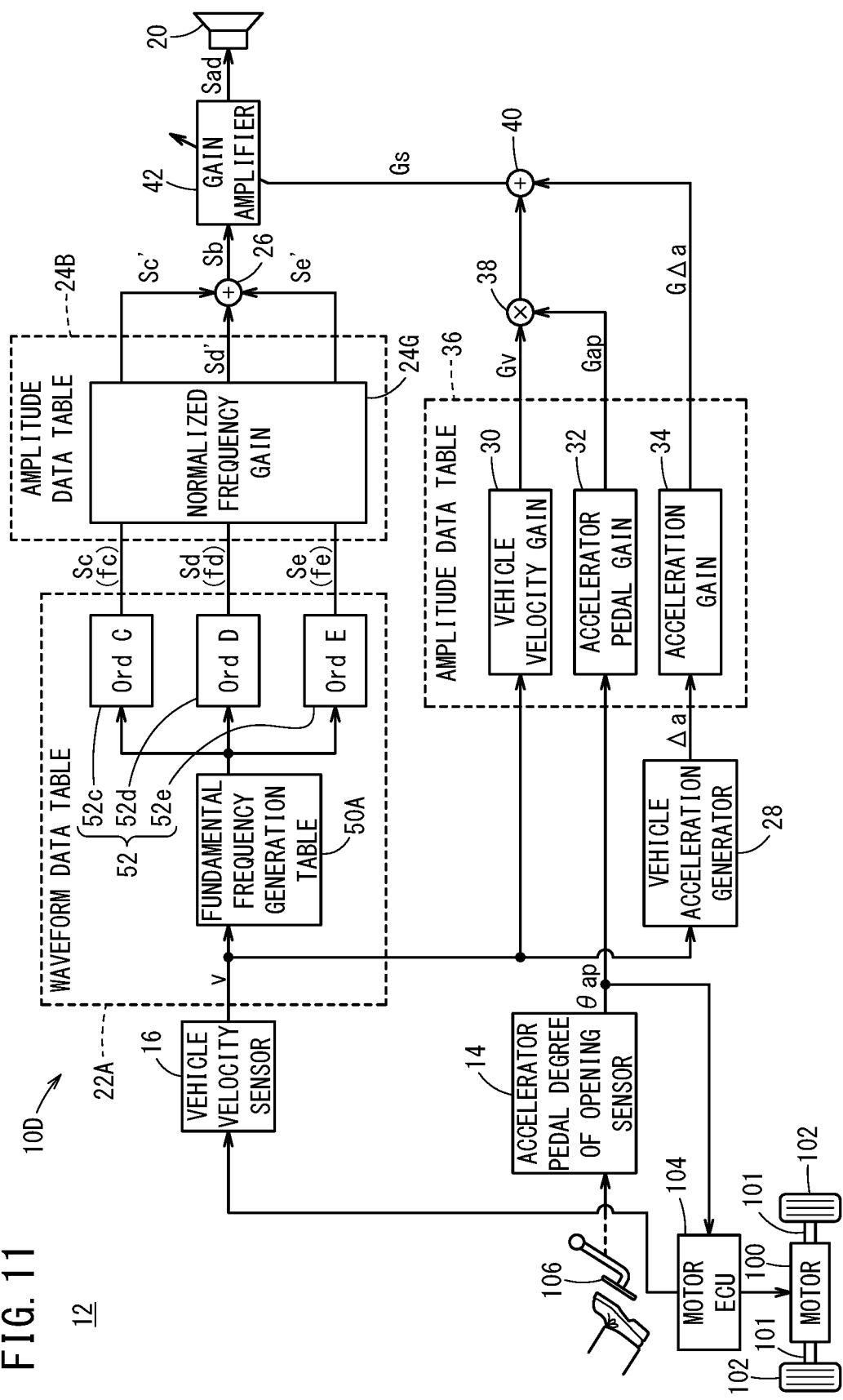
FIG. 11 is a block diagram showing a schematic configuration of a vehicle in which there is installed an active sound effect generating device according to a fifth embodiment.
Figure 12:
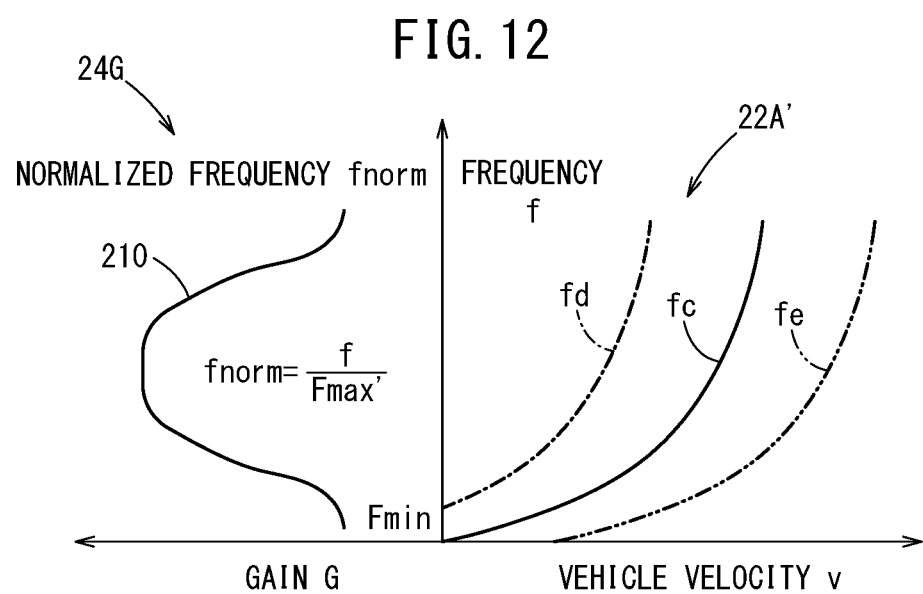
FIG. 12 is an explanatory diagram of a normalized frequency gain table according to the fifth embodiment.

Therefore, as shown in FIG. 11, in an active sound effect generating device 10D according to the fifth embodiment, the frequency gain table 24F, which was adopted in the fourth embodiment, is replaced by a normalized frequency gain table 24G having a characteristic of a gain G (normalized frequency gain characteristic) 210 as shown in FIG. 12.

According to the fifth embodiment, when utilizing the normalized frequency gain table 24G contained within an amplitude data table 24B, by way of the waveform data table 22A' (the waveform data table 22A shown in FIG. 7B) corresponding to the increase in the vehicle velocity v, and to explain with reference to the vehicle velocity vs. frequency characteristic which is shown on the right side of the vertical axis in FIG. 12 (the waveform data table 22 of FIG. 7B is shown schematically), ordered acoustic signals Sc, Sd, Se having the ordered acoustic frequencies fc, fd, fe are generated in accordance with the vehicle velocity v.

At this time, the upper limit frequency Fmax' is converted into a normalized frequency fnorm, and the amplitudes (gain G) of the ordered acoustic signals Sc, Sd, Se are determined from the characteristic (normalized frequency gain characteristic) 210 of the gain G (see FIG. 12) corresponding to the frequency f of the ordered acoustic frequencies fc, fd, fe, whereupon the acoustic signals Sc', Sd', Se' are generated.

In this manner, by utilizing the characteristic 210 of the normalized frequency gain table 24G shown in FIG. 12, it is possible for the upper limit frequency Fmax' to be changed in accordance with the vehicle velocity v, so that the feeling of acceleration can be enjoyed more, and together therewith, it is possible to generate sound effects in which switching of the sound effects is not sensed at a time of switching of the frequency f from the upper limit frequency Fmax' to the lower limit frequency Fmin.

Stated otherwise, when the upper limit frequency Fmax' is switched to the lower limit frequency Fmin (or Fmin') in accordance with an increase in the vehicle velocity v, the sound effects can be switched smoothly, naturally, and without a sense of discomfort.

The present invention is not limited to the embodiments described above, and it goes without saying that various configurations could be adopted therein without departing from the essence and gist of the present invention as set

What is claimed is:

1. An active sound effect generating device installed in a vehicle equipped with an electric motor as a drive source for the vehicle, comprising:
   a vehicle speed sensor configured to detect a vehicle velocity; and
   a computer configured to function as a vehicle velocity corresponding frequency setting unit that sets a vehicle velocity corresponding frequency of a sound effect made up from frequencies having a plurality of ordered components so as to be generated from a speaker in accordance with a detected vehicle velocity;
   wherein the vehicle velocity corresponding frequency setting unit is configured to set the vehicle velocity corresponding frequency between a lower limit frequency and an upper limit frequency, and exponentially increase the frequencies having the plurality of ordered components in accordance with an increase in the vehicle velocity, respectively, from the lower limit frequency to the upper limit frequency, together with setting a frequency ratio of the plurality of ordered components so as to have a constant multiple relationship, and performing a control in a manner so that the sound effect is generated repeatedly between the lower limit frequency and the upper limit frequency in accordance with an increase in the vehicle velocity, and
   wherein assuming:
   the constant multiple is indicated by a (a>1);
   the vehicle velocity corresponding frequency is indicated by fn, fn×a, fn×a^2, . . . , with the symbol ^ indicating exponentiation;
   the lower limit frequency is indicated by Fmin;
   the upper limit frequency is indicated by Fmax;
   the vehicle velocity is indicated by v;
   a frequency rate of change adjustment coefficient is indicated by k; and
   the vehicle velocity v when the sound effect has reached the upper limit frequency Fmax is indicated by V;
   then the vehicle velocity corresponding frequency fn may be determined by the expression:

$$fn = Fmin \times a^{\{(v-V)/k\}},$$

wherein if fn≥Fmax, then V→V+1.

2. The sound effect generating device according to claim 1, wherein assuming:
   the constant multiple is indicated by a (a>1);
   the vehicle velocity corresponding frequency is indicated by fn, fn×a, fn×a^2, . . . with the symbol ^indicating exponentiation;
   the lower limit frequency is indicated by Fmin;
   the upper limit frequency is indicated by Fmax;
   the vehicle velocity is indicated by v;
   a frequency rate of change adjustment coefficient is indicated by k;
   the vehicle velocity v when the sound effect has reached the upper limit frequency Fmax is indicated by V;
   a vehicle velocity increment is indicated by Δv;
   a sound effect increment is indicated by Δfn; and
   a vehicle velocity corresponding frequency, which is lower than the vehicle velocity v by the vehicle velocity increment Δv, is indicated by fn−1;

then the vehicle velocity corresponding frequency fn is determined by the expression:

$$fn=(fn-1)+\Delta fn==(fn-1)+\{(\log a)/k\}\times F\min\times a\hat{\ }\{(v-V)/k\}\times\Delta v,$$

wherein if fn≥Fmax, then V→V+1(0,v1, v2, or v3, . . . ), and fn→Fmin.

3. An active sound effect generating device according to claim 2, wherein the frequency rate of change adjustment coefficient k is controlled based on the vehicle velocity v.

4. The active sound effect generating device according to claim 1,
wherein the computer is further configured to function as a gain device that multiplies a sound effect signal input to the speaker by a gain multiplier;
wherein the gain device is configured to set the gain multiplier in a manner so that the sound effect becomes smaller at a time of switching the vehicle velocity corresponding frequency from the upper limit frequency to the lower limit frequency during an increase in the vehicle velocity.

5. The active sound effect generating device according to claim 1, wherein, in the vehicle velocity detecting device configured to detect the vehicle velocity, the vehicle velocity is detected on a basis of a rotational speed of a motor as a drive source of the vehicle wheels.

6. The active sound effect generating device according to claim 1, wherein the upper limit frequency is increased in accordance with an increase in the vehicle velocity.

7. The active sound effect generating device according to claim 1, wherein, in accordance with an increase in the vehicle velocity, the vehicle velocity corresponding frequency is subjected to processing in a manner so that an amount of change in the frequency with respect to an increase in the vehicle velocity on a high vehicle velocity side becomes greater in comparison with an increase in the vehicle velocity on a low vehicle velocity side.

* * * * *